United States Patent [19]

Osipyan

[11] 3,918,314

[45] Nov. 11, 1975

[54] BEVEL GEAR DRIVE WITH CIRCLE-ARC TEETH

[76] Inventor: Armen Vartanovich Osipyan, Onezhskaya ulitsa, 20, kv. 11, Moscow, U.S.S.R.

[22] Filed: Jan. 13, 1975

[21] Appl. No.: 540,701

Related U.S. Application Data

[63] Continuation of Ser. No. 414,278, Nov. 9, 1973, which is a continuation of Ser. No. 230,590, March 1, 1972, abandoned.

[52] U.S. Cl. ............................................. 74/459.5
[51] Int. Cl.² ........................................ F16H 55/04
[58] Field of Search................... 74/459.5, 457, 462

[56] References Cited
UNITED STATES PATENTS
3,709,055   1/1973   Grove .................................. 74/462

Primary Examiner—Leonard H. Gerin
Attorney, Agent, or Firm—Holman & Stern

[57] ABSTRACT

A bevel gear drive provided with circle-arc teeth in which the face of the contacting driven gear tooth is located at such a distance from the pinion axis along the center-to-center line of a reference spur gear drive which exceeds the radius of the pinion pitch circle by up to 0.5 $m_s$ at $\xi_1 + \xi_2 > 0$ and up to 0.1 $m_s$ at $\xi_1 + \xi_2 = 0$ The relation of addenda of the contacting teeth in case of an equal-shift correction is $h_1/h_2 = -13$ to $-76$ while in case of an unequal-shift correction it is $h_1/h_2 = 1.30 - 6.0$.

2 Claims, 3 Drawing Figures

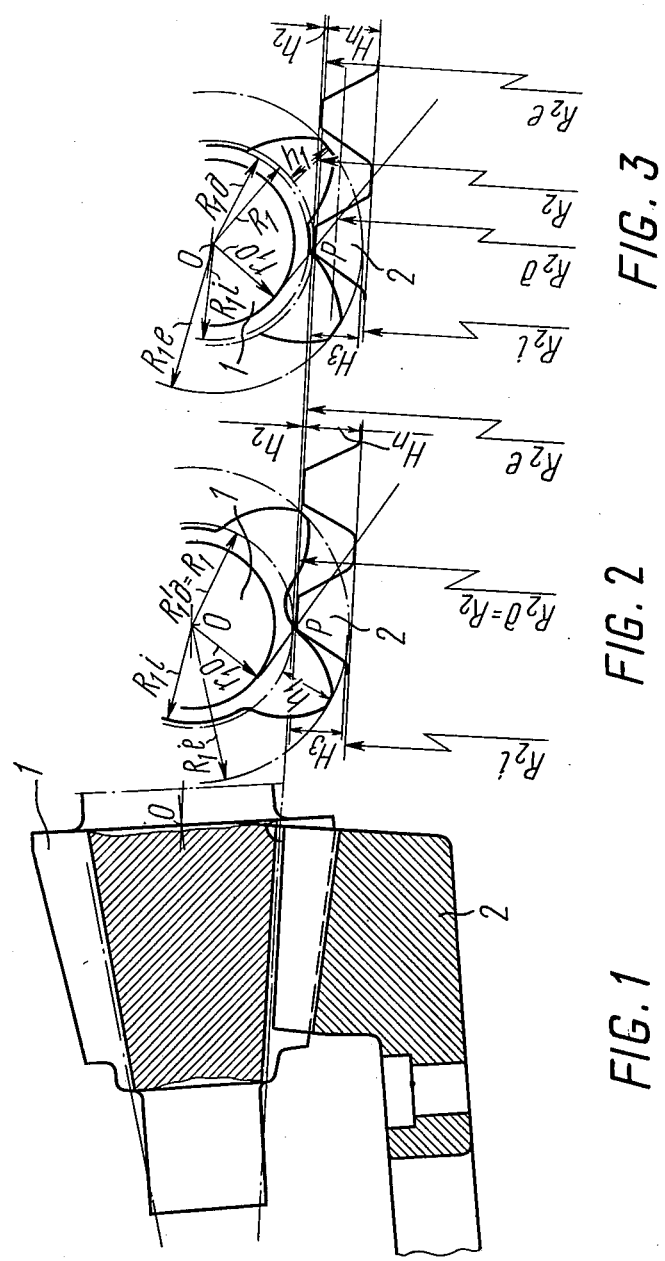

BEVEL GEAR DRIVE WITH CIRCLE-ARC TEETH

This is a continuation of application Ser. No. 414,278 filed Nov. 9, 1973 which in turn is a Rule 60 continuation of Ser. No. 230,590 filed Mar. 1, 1972, now abandoned.

BACKGROUND OF THE INVENTION

The present invention relates to an improvement of a bevel gear drive provided with circle-arc teeth which finds wide application in various branches of industry, particularly in automotive engineering.

PRIOR TECHNIQUES

Commonly used in modern automotive engineering are bevel gear drives based on the principle evolved by the "Gleason" Works (see, for example, Product Engineering, July 1963, Wells Coleman "Design of Bevel Gears", Gleason Works "Design data for automotive drive axles") giving recommendations for the selection of all the basic tooth elements and of the drive as a whole, both for general mechanical engineering and for automotive power transmissions.

The known systems for correcting the bevel gears are based on the principle of equal-shift correction whose shift coefficient depends on the speed ratio while the factor of the total height correction of the teeth depends on the number of pinion teeth.

The system of the Gleason works utilizes the principle of equality of Almen Straub parameter $K_I V \tau_I T_I$ at the beginning of contact on the root of the pinion teeth and $K_{II} V \tau_{II} T_{II}$ at the end of contact on the root of the gear teeth in which $K_I$ and $K_{II}$ are the unit pressures according to Hertz formula; $V \tau_I$ and $V \tau_{II}$ are the speeds of slipping at the same points (at the beginning of contact I and the end of contact II); $T_I$ and $T_{II}$ are the distances from the pitch point to the point of contact at the beginning I and end II of contact.

The minimum number of pinion teeth in this system for cargo trucks, buses and truck tractors is six.

The thicknesses of the matching gear and pinion teeth are selected so as to ensure equal bending fatigue strength.

The system worked out by the Experimental Institute of Metal-cutting Machines, USSR, and intended, basically, for use with gear wheels utilized in machine-tool and general engineering is based on the equality of specific tooth slipping at the beginning and end of contact. $\xi_I = \xi_{II}$ (see, for example, V. N. Kendrinsky, K. M. Pismanik "Bevel Gear Cutting Machines", Moscow 1958).

These systems also provide for tangential correction which makes it possible to select the appropriate thicknesses of the matching gear teeth, etc.

In automotive engineering practice, it has been found that such numbers as 8, 7, 6 and, not infrequently, 5 are quite favorable for obtaining a smallest possible diameter of the driven gear and a corresponding maximum road clearance at a large speed ratio.

However, the teeth of the 6-tooth and, moreover, 5-tooth pinion in the known systems fail to ensure the required contact strength and, particularly, bending strength; in this case, the main types of tooth failure are pitting of the tooth working surface and their fatigue failure.

In addition in the 5-tooth or even 6-tooth pinions insufficient diameter of the pinion shaft limits the value of the torque transmitted.

Should it become necessary to increase somewhat the shaft diameter, this results, usually, in undercutting of the pinion shaft which leads to a sharp reduction of strength and supporting surface of the pinions shaft required for mounting the bearings.

However, the possibility of reducing the number of pinion teeth from seven to five at a given gear diameter in the case of a 40-tooth driven gear, with the diameter being determined by the required road clearance, increases the speed ratio from 5.7 to 8, i.e approximately by 40%. Therefore, to increase the pinion strength at a large speed ratio, a hypoid drive a employed.

However, the use of hypoid drives involves such difficulties as employment of special lubricants, more stringent requirements for the workmanship of the matching surfaces and gives a relatively lower efficiency caused by additional friction in the direction of the hyperboloid generatrix.

In addition, the use of the equal-shift height and tangential corrections in the bevel gear drives with a relatively small number (9 – 12) of pinion teeth and a small speed ratio $i = 1.7 - 2.25$ fails to produce the desirable effect with respect to the bending and contact strength.

OBJECTS AND SUMMARY OF THE INVENTION

An object of the present invention resides in eliminating the aforesaid disadvantages.

The main object of the present invention is to provide a bevel gear drive with circle-arc teeth in which the shape of the teeth increases the contact and bending strength of the pinion teeth and of the gear pair, makes it possible to have the pinion with a minimum number of teeth at a maximum diameter of the pinion shaft without shaft undercutting and ensures a minimum addendum circle diameter of the driven gear which plays an especially important role in providing large speed ratios in one stage, e.g. in a single-reduction final drive of the automotive driving axle; morever this drive can be made in the form of an equal-shift and angular positive drive which widens considerably the field of application of corrected drives, particularly, the entire range of bevel gear drives used in the first stage of the double-reduction final drives of automotive driving axles.

This object is accomplished in that a bevel gear drive is provided with circle-arc teeth consisting of a pinion and a gear in which, according to the invention, the force of the contacting gear tooth is located at such a distance from the axis of the pinion along the center to center line of a reference spur gear drive which exceeds the radius of the pinion pitch circle by up to 0.5 $m_s$ at $\xi_1 + \xi_2 > 0$ and up to 0.1 $m_s$ at $\xi_1 + \xi_2 = 0$ wherein $m_s =$ face module; $\xi_1$ and $\xi_2$ are the amount-of-correction factors; in this case, the addendum ratio of the matching teeth is $h_1/h_2 = -13 - -76$ in case of an equal-shift correction and $h_1/h_2 = 1.3 - 6.0$ in case of unequal-shift correction where $h_1 =$ pinion addendum and $h_2 =$ gear addendum.

It is practicable that the whole tooth depth be $H_w = 1.356 - 1.688\ m_s$ in case of an equal-shift correction and $H_w = 1.356 - 1.788\ m$ in case of an unequal-shift correction at a tooth depth coefficient of $f_o = 0.6 - 0.75$ and $f_o = 0.6 - 0.8$, respectively, and at a cutter profile angle $\alpha = 20° - 24°$.

In such a design of the bevel drive gears, the pinion teeth have thicker tooth roots and thinner tooth faces.

Besides, the addendum circle of the driven gear in a reducing drive intersects the line of action after the pitch point at a distance of up 0.1 gear module so that the tooth roots of the driven gear come in contact (counting from the pitch circles) with the tooth faces of the pinion. The active part of the line of action is shifted beyond the pitch point by increasing considerably the shift coefficients of the pinion and driven gear so that the beginning of the active section of the line of action lies mainly at a distance of up to 0.1 gear module from the pitch point. As a result, the zone of the pitch point and the surfaces of the pinion tooth faces and gear tooth roots (counting from the pitch circles) adjoining the pitch point zone take no part in meshing which eliminates the contact of the pitch point zone on the pinion tooth profile, with the zone being particularly vulnerable - pitting. At the same time, the zones of the pinion tooth roots and gear tooth faces also highly susceptible to pitting are completely freed from contact.

All these factors raise considerably (more than twice) the contact and bending fatigue strength of the bevel gear drive according to the invention as compared with the known bevel gear drives; they provide the possibility of making a minimum number of pinion teeth at a maximum possible diameter of the pinion shaft with a minimum undercutting, or none at all and a considerably larger supporting surface of the pinion shaft front and rear journals; a possibility of obtaining a considerably larger speed ratio at a given length of the drive, and smaller weight and size; a relative noiselessness.

In addition, the bevel gear drive, according to the invention, can be made with an equal-shift and unequal-shift correction, with the latter not being used in the known system and not employed heretofore.

The bevel gear drive with unequal-shift correction, according to the invention, makes it possible to broaden considerably the field of application of corrected gear drives with a relatively small number of pinion teeth (5 - 13), a small total number of teeth $Z_t=27$ —40 (from 5/22 to 5/30; from 6/21 to 6/29; from 7/20 to 7/29; from 8/19 to 8/29; from 9/18 to 9/29; from 10/17 to 17/29; from 11/18 to 11/29 and from 12/20 to 12/25); and with relatively small speed ratios from i = 1.7 and above and, in particular, it embraces the entire range of bevel gear drives used in the first stages of the double-reduction final drives of automotive driving axles.

BRIEF DESCRIPTION OF THE DRAWINGS

Now the invention will be described in detail by way of an example of a bevel gear drive provided with circle-arc teeth, with reference to the accompanying drawings:

FIG. 1 is an elementary diagram in section of the bevel gear drive according to the invention;

FIG. 2 shows diagrammatically the engagement of gears in the plane perpendicular to the common generatrix of pitch cones in case of equal-shift correction and;

FIG. 3 is a view similar to FIG. 2 for unequal-shift correction.

The bevel gear drive provided with circle-arc teeth comprises a pinion 1 (FIGS. 1, 2 and 3) and a driven gear 2.

DETAILED DESCRIPTION OF THE DRAWINGS

The relation between the tooth elements in this drive is provided by selecting the appropriate amounts of correction $\xi_1$ and $\xi_2$ and outside diameters of gear blanks $D_{e1}$ and $D_{e2}$.

In a general case of unequal-shift correction (FIG. 3) these quantities are interconnected by the following formulas:

$D_{e1} = m_s[Z_1 + 2\cos\phi_{1H}(f_o + \xi_1 - \xi_e)]$
$D_{e2} = m_s[Z_2 + 2\cos\phi_{2H}(f_o + \xi_1 - \xi_e)]$ where:

$D_{e1}$ and $D_{e2}$ = diameters of pinion and gear blanks, respectively;

$Z_1$ and $Z_2$ = numbers of pinion and gear teeth, respectively; $m_s$ = face module;

$\xi_1$ and $\xi_2$ = cutter shift coefficients for the pinion and gear, respectively;

$\phi_{1H}$ and $\phi_{2H}$ = pitch cone angles of the pinion and gear, respectively;

$\xi_e$ = equalizing coefficient.

If $\xi_1 = -\xi_2$  $\xi_e = 0$

In case of unequal-shift correction, the addendum $h_1$ of the pinion 1 is 1.23 – 1.78 of the face module $m_s$ from the radius $R_{1p}$ of the pitch cone determined by the relation $R_{1p} = m_s \cdot Z_1/2$. The addendum $h_2$ of the driven gear 2 from the pitch circle radius $R_{2p}$ determined by the expression $R_{2p} = m_s \cdot Z_2/2$ is from 0.3 to 0.95 of the face module.

The whole tooth depth $H_w$ for both gears is 1.356 to 1.788 of the face module. The contact depth of tooth $H_c = 1.2 - 1.6$ of the face module and the relation $h_1/h_2 = 1.30 - 6.0$.

In engaging the gears, they are installed so that the distance from the tooth face of the driven gear 2 to the axis of the pinion 1 along the center-to-center line of a reference spur gear drive exceeds the radius of the pinion pitch circle by up to 0.5 of the face module at $\xi_1 + \xi_2 > 0$ and up to 0.1 $m_s$ at $\xi_1 + \xi_2 = 0$. The profile angle of the cutter is $\Delta = 20° - 24°$, and the tooth inclination angle $\beta_m$ from 35° to 45°; tooth depth coefficient $f_o = 0.60 - 0.8$; $f_c = 0.156 - 0.188$.

The bevel gear drive with equal-shift correction (FIG. 2) is designed on the basis of the following formulas:

$D_{e1} = m_s[Z_1 + 2\cos\phi_{1p}(f_o + \xi_1)]$
$D_{e2} = m_s[Z_2 + 2\cos\phi_{2p}(f_o + \xi_2)]$ where $\xi_1 = -\xi_1$ and $\phi_{1p}$ and $\phi_{2p}$ are the pitch cone angles of the pinion and gear.

The addendum $h_1$ of the pinion 1 is 1.22 – 1.6 $m_s$ from the radius $R_{1p}$ of the pitch circle determined by the relation $R_{1p} = m_s \cdot Z_1/2$ while the addendum $h_2$ of the driven gear 2 from the pitch circle radius $R_{2p}$ determined by the relation $R_{2p} = m_s \cdot Z_2/2$ is from –0.02 to –0.1 $m_s$.

The whole tooth depth $H_w$ for both gears is from 1.356 to 1.688 $m_s$, contact depth $H_c = 1.2 - 1.5$, relation $h_1/h_2 = -13$ to $-76$; $\phi = 20° - 24°$; tooth inclination angel $\beta_m = 35° - 45°$; tooth depth coefficient $f_o = 0.60 - 0.75$; $f_c = 0.156 - 0.188$.

Given below are the parameters of the gear teeth used in equal-corrected and unequal-corrected bevel gear drives provided with circle-arc teeth.

| Tooth parameters | Equal-shift correction | Unequal-shift correction |
| --- | --- | --- |
| Number of pinion teeth | 7 | 11 |
| Number of gear teeth | 36 | 24 |
| Face module | 6.08 | 9.193 |
| Profile angle of cutter basic contour | 23° | 20° |
| Helix angle at tooth middle | 38° | 35° |

-continued

| Tooth parameters | Equal-shift correction | Unequal-shift correction |
| --- | --- | --- |
| Length of pitch cone generatrix | 111.489 | 122.909 |
| Pinion addendum | 8.026 | 13.811 |
| Pinion dedendum | 0.912 | 0.685 |
| Gear addendum | −0.122 | 3.093 |
| Gear dedendum | 9.059 | 11.402 |
| Pinion addendum circle diameter | 58.016 | 126.23 |
| Gear addendum circle diameter | 218.836 | 223.21 |
| Pinion pitch circle diameter | 42.56 | 101.123 |
| Gear pitch circle diameter | 218.88 | 220.632 |
| Whole tooth depth | 8.938 | 14.496 |
| Contact tooth depth | 7.904 | 12.767 |
| Angle of pinion pitch cone | 11.0018° | 24.293 |
| Angle of gear pitch cone | 78.9964 | 63.785 |
| Angle of pinion addendum cone | For Design, 15.647° | for turning checking axis angle 15.1192 | For Design, 31.4980 | for turning checking axis angle 30.7077 |
| Angle of gear addendum cone | 79.465° | 78.9339  66.0267 | 65.2264 |
| Angle of pinion dedendum cone | 10.5331 | 23.973 |
| Angle of gear dedendum cone | 74.351 | 58.502 |
| Angle corresponding to radial clearance | 0.534° | 0.806° |
| Normal chordal depth of pinion tooth | 6.144 | 9.01 |
| Normal chordal thickness of pinion tooth | 9.59 | 13.67 |
| Normal chordal depth of gear tooth | 6.04 | 9.04 |
| Normal chordal thickness of gear tooth | 7.79 | 12.19 |

Given below is a comparative table of tooth parameters of the bevel gear drive according to the invention, and of the known systems with equal-shift correction.

| Teeth parameters | System acc. to invention | Gleason | Exper.Inst.of Metal-Cutting Machines |
| --- | --- | --- | --- |
| Tooth contact depth $H_c$ | 1.2 – 1.5 | 1.5 – 1.7 | 1.4 – 2.0 |
| Tooth depth coefficient $f_o$ | 0.60 – 0.75 | 0.75 – 0.85 | 0.7 – 1.0 |
| Whole tooth depth $H_w$ | 1.356 – 1.688 | 1.666 – 1.888 | 1.56 – 2.2 |
| Pinion addendum $h_1$ | 1.22 – 1.6 | 1.21 – 1.285 | 1.235 – 1.57 |
| Gear addendum $h_2$ | −0.02 – −0.1 | 0.215 – 0.49 | 0.165 – 0.43 |
| Relation $h_1/h_2$ | −13.0 – −76 | 2.47 – 5.97 | 3.65 – 7.5 |
| Cutter profile Angle $\alpha$ | 20 – 24° | 14.5°– 16° mainly 20° | 20° |
| Tooth inclination Angle $\zeta$ | 35 – 45° | 35 – 40 | 0 – 45° |
| Height coefficient of radial clearance $f_c$ | 0.156 – 0.188 | 0.106 – 0.188 | 0.16 – 0.2 |

The systems of bevel gear drives with circle-arc teeth employed by Gleason Works and by the Experimental Institute of Metal-Cutting Machines do not use unequal-shift correction at all.

A large positive correction in cutting the pinion teeth gives a considerable increase in their bending strength at an equal fatigue strength of the pinion and gear teeth and increases the corrected radius of curvature of the profiles of contacting teeth which allows a reduction in the contact stresses and an increase in their fatigue contact strength.

Comparative tests of the bevel gear drive according to the invention and of the Gleason drives have shown that, in spite of a high quality of the latter, the bevel drive according to the invention has had but a minor pitting damage after 400 hours of operation while the serialproduced Gleason drive tested under the same conditions has failed after not more than 73 hours of operation due to breakage and heavy pitting of teeth.

The term "equal shift correction" means such a correction of a bevel gear drive in which the increase of the diameter of the pinion tooth faces taper is accompanied by a corresponding reduction of the diameter of the driven gear tooth faces taper, or the increase of the pinion addendum with respect to the normal addendum equal to half the depth of engagement (or working depth) of the teeth is accompanied by the corresponding reduction of the driven gear tooth face.

With this, the pitch and primary tapers coincide and the shift coefficients of a production tool in relation to the pinion and driven gear being cut, respectively $\xi$, and $\xi_2$, are equal in magnitude but opposite in sign and their sum is zero.

The relation $h1/h2 = 1.30 - 6.0$ should be understood as the set limits of possible variations of the relation from $1.30 - 6.0$.

The tooth height coefficient has reference to the tooth depth coefficient or half the relation of the difference between the whole tooth depth and the bottom clearance, or the effective depth, to the module.

$$fo = (Hw-fcm)/2m \text{ or for } m = 1 \; fo = (Hw-fc)/2$$

The rotation "cutter profile angle" means the commonly used term "rated cutter pressure angle" or the "rated pressure angel" in the profile point corresponding to the pitch circle.

What I claim is:

1. A bevel gear drive provided with circle-arc teeth comprising a pinion having an axis and a mating gear the improvement being that the face of the contacting tooth of the mating gear is located at such a distance from the pinion axis along the center-to-center line of a reference spur gear drive which exceeds the radius of the pinion pitch circle by up to $0.5 \; m_s$ at $\xi_1 + \xi_2 > 0$ and up to $0.1 \; m_s$ at $\xi_1 + \xi_2 = 0$ where $m_s$ = face module; $\xi_1$ and $\xi_2$ = shift coefficients of cutter tool; in the case of an equal-shift correction the relation of addenda of the contacting teeth is $h_1/h_2 = -13$ to $-76$ while in the case of an unequal-shift correction $h_1/h_2 = 1.30 - 6.0$ where $h_1$ = pinion addendum and $h_2$ = gear addendum.

2. The bevel gear drive according to claim 1 in which the whole depth of the teeth is from 1.356 to 1.688 $m_s$ in the case of an equal-shift correction and from 1.356 to 1.788 $m_s$ in the case of an unequal-shift correction at a tooth height coefficient of $f_o = 0.6 - 0.75$ and $f_o = 0.6 - 0.8$, respectively, and a cutter profile angle of 20°–24°.

* * * * *